United States Patent [19]

Peash

[11] Patent Number: 4,749,004

[45] Date of Patent: Jun. 7, 1988

[54] AIRFLOW CONTROL VALVE HAVING SINGLE INLET AND MULTIPLE OUTLETS

[75] Inventor: Douglas E. Peash, Enumclaw, Wash.

[73] Assignee: The Boeing Company, Seattle, Wash.

[21] Appl. No.: 47,715

[22] Filed: May 6, 1987

[51] Int. Cl.⁴ .................................................. F16K 11/14
[52] U.S. Cl. ........................................ 137/865; 137/887;
74/321; 251/129.13; 251/248
[58] Field of Search ............... 137/862, 865, 870, 883,
137/887; 251/77, 248, 129.11, 129.13; 74/319,
321

[56] References Cited

U.S. PATENT DOCUMENTS

| | | | |
|---|---|---|---|
| 333,525 | 1/1886 | Kenna | 74/321 |
| 1,172,547 | 2/1916 | Moon et al. | 74/321 |
| 2,081,510 | 5/1937 | Smart | 137/146 |
| 2,507,044 | 5/1950 | Palmatier | 244/134 |
| 2,730,130 | 1/1956 | Guidry | 137/635 |
| 2,912,215 | 11/1959 | Forrester | 251/77 |
| 2,925,255 | 2/1960 | Shaw | 257/276 |
| 3,011,509 | 12/1961 | Wilson | 137/122 |
| 3,509,912 | 5/1970 | James | 137/610 |
| 3,701,362 | 10/1972 | Reese | 137/556.3 |
| 4,313,592 | 2/1982 | Bass | 251/162 |
| 4,388,766 | 6/1983 | Sanderson | 34/54 |
| 4,444,298 | 4/1984 | Stangroom | 192/21.5 |

*Primary Examiner*—A. Michael Chambers
*Assistant Examiner*—John Fox
*Attorney, Agent, or Firm*—Bruce A. Kaser

[57] ABSTRACT

A valve apparatus interconnects a single inlet duct with a plurality of outlet ducts. The apparatus has a manifold body that provides a passageway between the inlet and the outlets. Operatively positioned in each outlet is a butterfly valve. A single drive motor is used to operate all the valves, wherein each valve is operated independently of the other.

15 Claims, 2 Drawing Sheets

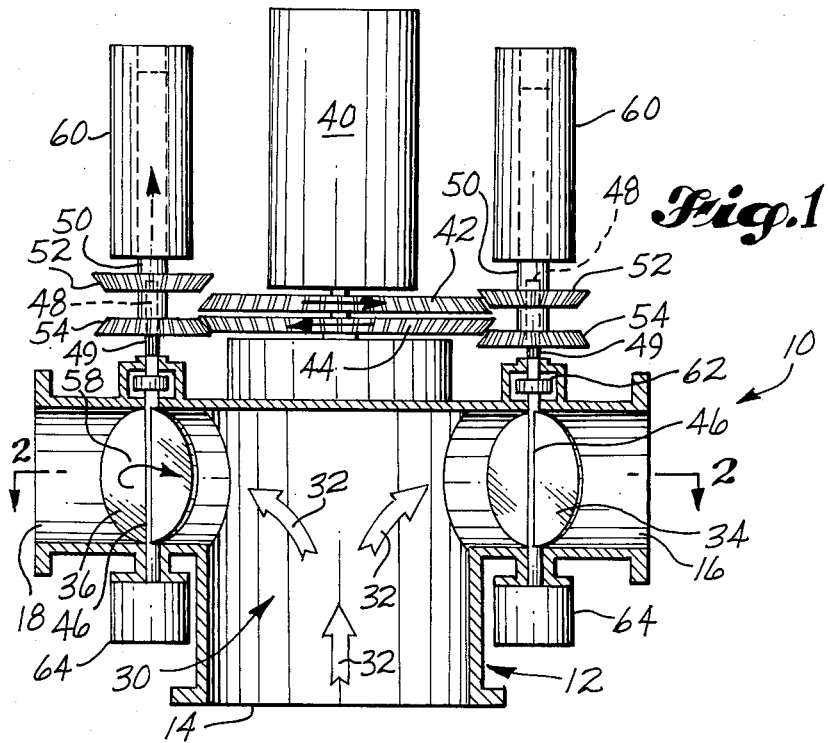
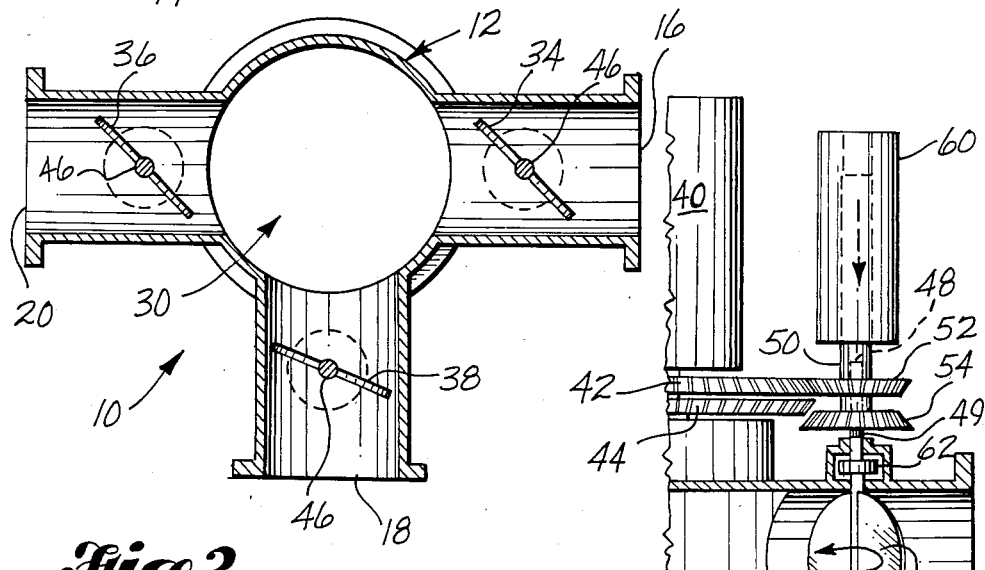
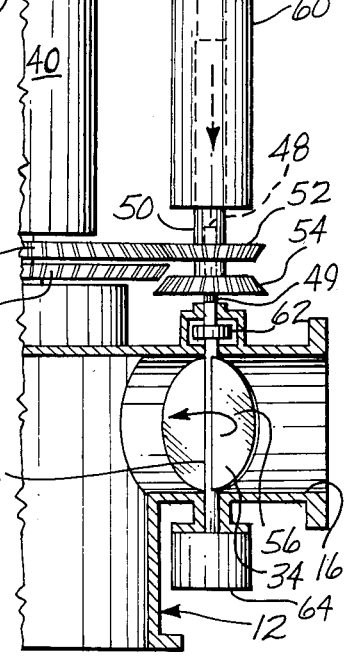

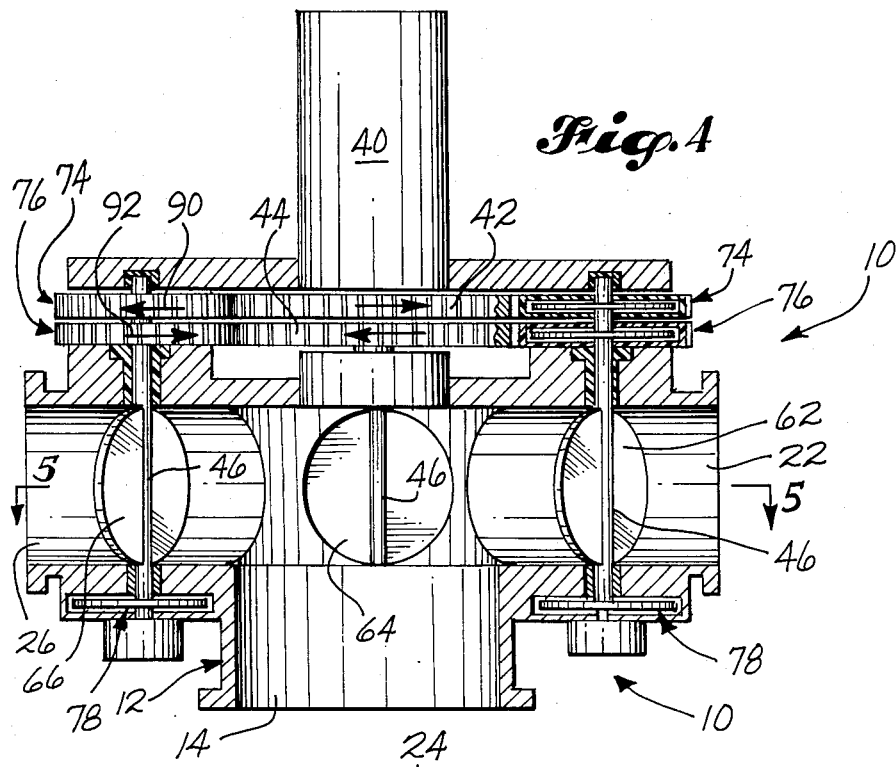
*Fig.* 4
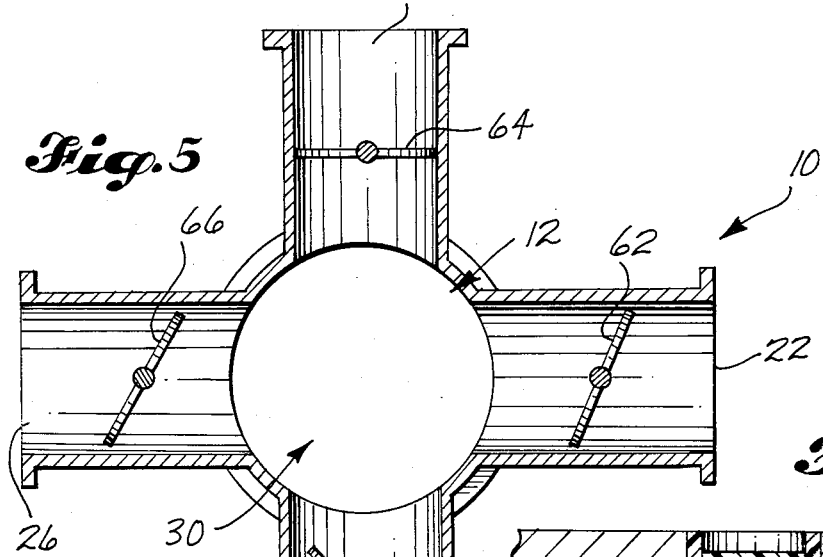
*Fig.* 5
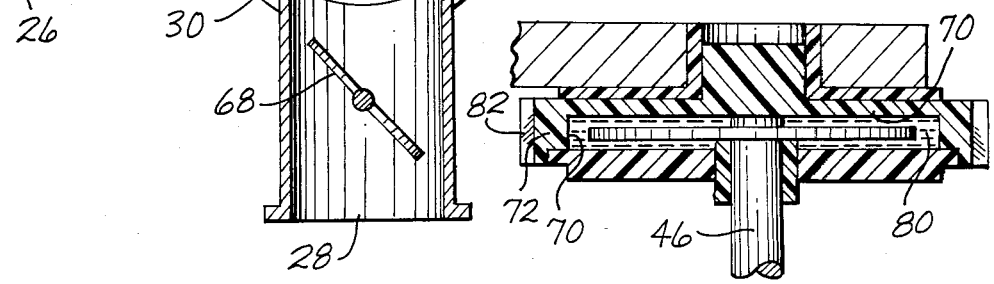
*Fig.* 6

AIRFLOW CONTROL VALVE HAVING SINGLE INLET AND MULTIPLE OUTLETS

TECHNICAL FIELD

This invention generally relates to systems in which an airflow is used to control the temperature of an environment. More particularly, the invention relates to valves which are used to control airflow in duct networks.

BACKGROUND ART

Present day commercial aircraft of a passenger carrying type utilize onboard air conditioning/distribution systems for regulating air temperature of passenger cabin and flight deck compartments. These systems employ temperature sensors in the compartments which sense air temperature therein and communicate this information to a system controller. An air conditioning pack or unit in the system produces a flow of cool, conditioned air at a certain temperature. The system controller causes this conditioned air to be communicated to either the flight deck or that zone in the passenger cabin which requires the lowest temperature air. Generally, this will be the flight deck since in most aircraft the flight deck has more window area which consequently produces greater solar heating. Remaining zones or areas in the passenger cabin, which require warmer air, are supplied with the same air produced by the air conditioning pack but which is warmed a certain amount by the addition of hot bleed air from an engine. In the past, addition or mixing of bleed air was controlled by a plurality of trim air control valves. Normally, a separate trim air control valve is required for each separate temperature control zone in the cabin and flight deck compartments. By way of example, a passenger cabin may have as many as three temperature control zones, meaning a total of four trim air control valves is needed, one for the flight deck and three for the passenger cabin. Each valve has a relatively complicated construction. For example, each has its own electric motor, speed reduction mechanism, sensors and switches. The complexity of these valves add significantly to aircraft weight and to the complexity of aircraft operation and maintenance. The purpose of the present invention, therefore, is to provide an improved trim air control valve apparatus that overcomes these disadvantages.

DISCLOSURE OF THE INVENTION

The present invention is a valve apparatus designed for communicating and controlling airflow from an inlet duct to a plurality of outlet ducts. The apparatus has a manifold body connected to the inlet duct in a suitable manner so as to receive incoming airflow therefrom. The manifold body is also connected to the outlet ducts, and has an internal passageway or chamber which provides a means for communicating the received airflow into the outlet ducts. A separate outlet control valve is positioned relative to each outlet duct for controlling the amount of airflow communicated from the passageway or chamber into and out through each outlet duct. If, for example, the apparatus is designed for distributing airflow from an inlet duct to three separate outlet ducts, the apparatus would therefore have three separate outlet valves.

All of the outlet valves are powered by a single drive motor. A clutch device drivingly engages or disengages each outlet valve, as may be needed, to control airflow through its respective duct when the motor is in an operating condition. Engagement is used to cause the valve to adjust outlet airflow to a desired amount. Disengagement takes place when the adjustment is finished. Each outlet valve is drivingly engagable with the motor independently from other valves. In other words, one valve may be operated to adjust air flow while another is not, and vice versa.

An objective of the present invention is to replace a plurality of individual trim air control valves, and the complexity associated therewith as described above, with a single valve module that controls airflow from a single source inlet port or duct to multiple outlet ports or ducts. In reaching this objective, the invention has certain advantages and features not believed to be present in the known prior art. For example, the apparatus disclosed above utilizes a single electrical motor to control a plurality of outlet valves. Formerly, each valve would have its own separate motor. Further features and structural details of the invention will be provided below.

BRIEF DESCRIPTION OF THE DRAWINGS

In the drawings, like reference numerals and letters refer to like parts throughout the various views, and wherein:

FIG. 1 is a side view of a valve apparatus constructed in accordance with one embodiment of the invention, wherein a manifold body portion of the apparatus is shown in cross-section;

FIG. 2 is a top cross-sectional view of the apparatus shown in FIG. 1, and is taken along line 2—2 in FIG. 1;

FIG. 3 is a fragmentary view of the right-hand portion of FIG. 1, and shows operation of an outlet butterfly valve for controlling airflow through an outlet duct;

FIG. 4 is a view similar to FIG. 1, but shows a second embodiment of the invention, wherein the manifold body portion of the apparatus is shown in cross-section;

FIG. 5 is a top cross-sectional view of the apparatus shown in FIG. 4, and is taken along line 5—5 in FIG. 4; and FIG. 6 is an enlarged fragmentary view of the upper right-hand corner of the manifold body shown in FIG. 4, and illustrates the construction of a clutch device that utilizes an electro-rheological fluid.

BEST MODE FOR CARRYING OUT THE INVENTION

Referring now to the drawings, and first to FIG. 1, therein is indicated at 10 one embodiment of a valve apparatus constucted in accordance with the invention. The apparatus 10 includes a manifold body 12 having a single inlet port or duct 14 and a plurality of outlet ports or ducts. The number of ports or ducts may, of course, vary. In the embodiment shown in FIGS. 1-3, the apparatus 10 is shown having a total of three outlet ducts 16, 18, 20. In the embodiment shown in FIGS. 4-6, the apparatus 10 is shown having four outlet ducts 22, 24, 26, 28.

Directing attention first to the embodiment shown in FIGS. 1-3, the manifold body 12 has a chamber 30 which provides a passageway or means for communicating airflow from the inlet duct 14 to the outlet ducts 16, 18, 20. This is schematically indicated by arrows 32 in FIG. 1. The other embodiment, shown in FIGS. 4-6 has a similar chamber 30 which operates in the same way. This embodiment will be further discussed later, and for the time being, attention is directed solely to the embodiment shown in FIGS. 1-3.

Operatively positioned in each outlet duct 16, 18, 20 is a rotatable butterfly valve 34, 36, 38. Power for opening and closing each outlet valve 34, 36, 38 is supplied by a single, conventional electrical motor 40 mounted to the top of the manifold body 12.

A first pair of circular, concentric and parallel bevel gears 42, 44 are connected to the output shaft of the motor 40. The gears 42, 44 are preferably equal in diameter. A suitable gear reverser, which would be familiar to a person skilled in the art, and which is not shown in the drawings, is used to make this connection in a manner so that the gears 42, 44 rotate in opposite directions when the motor 40 is operating.

Each butterfly valve 34, 36, 38 is rotationally mounted in ducts 16, 18, 20 by a rotatable shaft 46. Slidably connected to the upper end 48 of shaft 46 is a second rotatable shaft 50. A suitable spline connection 49 exists between shafts 46 and 50 so that they cannot rotate relative to each other. This is conventional and would be familiar to a person skilled in the art. Fixedly connected to shaft 50 are a second pair of gears 52, 54. These latter gears are also circular, concentric and parallel, and have equal diameters but are in spaced relationship to each other. Their outer edges are located near the outer edges of the first pair of bevel gears 42, 44. Axially moving the second shaft 50 relative to the first 46 cuases one of said second pair to be engaged with one of said first pair. Referring to FIG. 3, for example, shaft 50 is shown moved downwardly to a first position so that gear 52 is in engagement with gear 42. This would cause buttefly valve 34 to rotate in the direction indicated by arrow 56. On the other hand, and as can be seen by referring to the left-hand side of FIG. 1, moving shaft 50 upwardly to a second position causes gear 54 to move into engagement with gear 44 which, in turn, causes opposite rotation of the butterfly valve as indicated at 58. Thus, rotatable shafts 46, 50 provide a means, in combination with the power train engagement provided by gears 42, 44, 52, 54, for transfering power from the motor to operate each butterfly valve 34, 36, 38.

Upward and downward axial movement of the second shaft 50 and the second gear pair 52, 54 is caused by an electrically operated solenoid 60, the function and construction of which would be familiar to a person skilled in the art. Normally, when it is not desirable to adjust one of the outlet valves 34, 36, 38, the second gear pair 52, 54 occupies a neutral position, as shown on the right-side of FIG. 1 where none of the gears 42, 44, 52, 54 are engaged. The second shaft 50 may be biased into such position by suitable springs, although this is not shown in the drawings. A brake assembly 62 of a conventional nature is provided for holding each butterfly valve fixed in position when it is not drivingly engaged with the motor 40. Also, a sensor 64 may be provided to indicate the angular position of each valve, which indicates the degree to which it is open or closed, for the purpose of controlling the amount of airflow through each respective outlet duct 16, 18, 20.

As mentioned above, a second embodiment of the apparatus 10 is shown in FIGS. 4-6. FIGS. 4 and 5 show the manifold body 12 having four rotatable butterfly valves 62, 64, 66, 68 for controlling outlet flow through ducts 22, 24, 26, 28. In this embodiment, the drive means for engaging each valve shaft 46 with drive gears 42, 44 is provided by an electro-rheological fluid 80.

FIG. 6 depicts a typical clutch assembly 74 having an electro-rheological fluid 80 that provides a means for connecting the valves 62, 64, 66, 68 to either one of the drive gears 42, 44. The construction of such assembly would be familiar to a person skilled in the art and is generally described in the November 1985 issue of Automotive Engineering Magazine on pages 75-79. Briefly, this type of clutch assembly 74, utilizes a gear housing 72 having a cavity, the sidewalls thereof being indicated at 70, which is filled with an electro-rheological fluid. The gear housing 72 has gear teeth 82 which are in engagement with another drive gear, such as one of drive gears 42, 44. Normally, the housing 72 rotates as the drive gear rotates (see arrows 90, 92 in FIG. 4). But the fluid 80 cannot adequately transfer power to the shaft 46 so that it too rotates. Suitable electrodes are used to place a charge on the fluid 80, which causes it to solidify. This brings the valve shaft 46 into fixed engagement with the gear housing 72, which is further driven by one of the gears 42, 44, thus rotating the shaft 46 and its corresponding butterfly valve. In this embodiment no axially movable shafts are required, such as shaft 50 in FIGS. 1-3, for example, in order to bring one gear into engagement with another.

A separate clutch assembly indicated generally at 74 and 76 in FIG. 4 would be provided for bringing the shaft 46 into engagement with each gear 42, 44. Depending on desired rotation of a valve, electrodes in either one of the two clutch assemblies 74, 76 would be activated. A third assembly 78, of similar construction, would be activated to brake each valve and hold it in a desired position when both assemblies 74, 76 are not in use.

The functional operation of both of the above-described embodiments is similar. When the apparatus 10 is used in connection with a conventional aircraft air conditioning system, the motor 40 would be activated at the same time the air conditioning system is activated. Then, individual butterfly valves would be operated in accordance with the needs of the air conditioning system. It is apparent, that the various butterfly valves can be operated independently of the other. That is, each butterfly valve has its own means for drivingly engaging it with the motor 40. One valve may be operated while another is not, or more than one valve may be operated while another is not simply by selectively activating the solenoid 60 in the embodiment shown in FIGS. 1-3, or the clutch assemblies 74, 76 in the embodiment shown in FIGS. 4-6.

Thus, having now described the invention, it should be appreciated that many changes could be made in the two above-described embodiments without departing from the spirit and scope of the invention. Although the embodiments are specially designed for use in providing hot bleed or trim air to an aircraft air conditioning system, it should be appreciated that the invention could be used in a wide variety of applications both in aircraft and other applications as well. It should be appreciated, therefore, that any patent coverage rightfully due should not be limited by the above description, but should only be limited by the subjoined patent claims, wherein such claims are to be interpreted in accordance with the doctrines of patent law.

What is claimed is:

1. An apparatus for use in controlling airflow communication from an air inlet duct to a plurality of air outlet ducts, said apparatus comprising:
- a manifold body connected to said air inlet duct in a manner so as to receive an airflow therefrom, and connected to said outlet ducts, said manifold body including air passageway means for communicating said received airflow into said outlet ducts, and including
- a separate outlet valve operatively positioned relative to each outlet duct for controlling the amount of said airflow communicated into each duct, and further including
- a single drive motor, and still further including
- clutch means for drivingly engaging and disengaging each outlet valve with said drive motor, in a manner so as to operate each valve so that said valve adjustably controls outlet airflow through said valve's respective outlet duct in a desired manner, and wherein said clutch means is operative to operate each outlet valve independently from the other, so that one valve may be operated to adjust airflow while another is not, and vice versa, said clutch means further including
- a first pair of circular drive gears positioned in parallel and concentric relationship with respect to each other, said gears being drivingly connected to said motor in a manner so that said gears rotate in opposing directions when said motor is operating,
- rotatable shaft means, connected to each outlet valve, wherein rotation of said shaft means causes said valve to adjust outlet airflow through said valve's respective outlet duct, and
- drive means for engaging said rotatable shaft means with one of said gears, in a manner so that rotation of said gear when said motor is operating causes said shaft means to rotate, and wherein said drive means is operable to selectively engage said shaft means with either gear at any one time, to cause said shaft means to rotate in one direction or another depending on which gear is in engagement with said shaft means.

2. The apparatus of claim 1, wherein said shaft means' axis of rotation is positioned generally parallel to the axis of rotation of said first pair of circular drive gears, and wherein said drive means further comprises
- a second pair of circular gears, said second pair being connected to said shaft means and positioned in spaced but concentric relationship with respect to each other, and in concentric relationship with respect to said shaft means' axis of rotation, wherein said shaft means is movable along said axis between first and second positions, said first and second gear pairs being shaped and positioned relative to each other such that when said shaft means is in said first position one of said first pair of gears is in gear engagement with one of said second pair of gears, to rotationally drive said shaft means in one direction, and when in said second position the other of said first pair is in gear engagement with the other of said second pair, to rotationally drive said shaft means in another direction.

3. The apparatus of claim 2, including an electrically operated solenoid valve connected to said shaft means in a manner for axially moving said shaft means back and forth between said first and second positions.

4. The apparatus of claim 1, wherein said drive means further comprises:
- first means for using an electro-rheological fluid to drivingly engage said shaft means with either one of said first pair of circular drive gears, to rotate said shaft means in one direction or another depending on which one of said gear pair is in engagement with said shaft.

5. The apparatus of claim 4, including:
- second means, connected to each valve, for using an electro-rheological fluid to maintain said valve in a certain operative position, wherein said second means is operative only when said first means is inoperative, and vice versa.

6. The apparatus of claim 1, wherein said outlet valve is a rotatable butterfly valve positioned in said outlet.

7. The apparatus of claim 6, including means for sensing rotational position of said butterfly valve, to provide an indication of the amount of airflow permitted by said valve through said outlet duct.

8. The apparatus of claim 1, wherein said drive motor is mounted to said manifold body.

9. An airflow control apparatus, comprising:
- a manifold body having a central cylindrical chamber, and an inlet duct portion for delivering an airflow into said chamber positioned adjacent one axial end of said chamber, and further having a plurality of outlet duct portions projecting outwardly from the side of said chamber, for communicating said airflow outwardly from said chamber,
- a drive motor mounted to said manifold body adjacent the other axial end of said chamber,
- a separate butterfly valve positioned in each outlet duct portion, each butterfly valve being independently rotatably operative to adjustably control the amount of said airflow communicated from said chamber out through each respective outlet duct portion,
- clutch means for drivingly engaging and disengaging each butterfly valve with said drive motor, in a manner to cause rotation of said butterfly valve, wherein said clutch means is operative to operate each butterfly valve independently from the other, said clutch means including a pair of circular drive gears positioned in parallel and concentric relationship with respect to each other, said gears being drivingly connected to said motor in a manner so that said gears rotate in opposing directions when said motor is operating, and said clutch means still further including drive means for drivingly engaging said butterfly valve with one of said gears when said motor is operating, to rotate said butterfly valve in one direction or another depending upon which gear is in engagement with said butterfly valve.

10. The apparatus of claim 9, wherein the axis of rotation of each butterfly valve is parallel to but offset from the axis of rotation of said circular drive gears, and wherein
- said drive means includes a separate pair of other circular gears connected to each separate butterfly valve, said gears in said other air being in spaced but concentric relationship with respect to each other, and axially translatable between first and second positions along the axis of rotation of said other pair's respective butterfly valve, said other pair maintaining said spaced and concentric relationship during such translation, and wherein said pair of circular drive gears, which are connected to said motor, and each of said other pairs are shaped and positioned relative to each other so that when the gears of said other pair are in said first axial position, one of said circular drive gears engages with one of said other pair, to rotationally drive said respective other gear's butterfly valve in one direction, and when said other pair is in said second position, said other circular drive gear engages with the second gear of said other pair, to rotationally drive said butterfly valve in another direction.

11. The apparatus of claim 10, including an electrically operated solenoid valve connected to said other pair of circular gears, in a manner for axially translating said other pair between said first and second positions.

12. The apparatus of claim 9, wherein said driven means further comprises:
first means for using an electro-rheological fluid to selectively put each butterfly valve in driving engagement with one of said first pair of circular drive gears to rotate each butterfly valve in one direction or another depending on which one of said gear pair is in engagement with said butterfly valve.

13. The apparatus of claim 12, including
second means for using an electro-rheological fluid to hold each butterfly valve in a certain operative position, wherein said second electro-rheological fluid means is operative only when said first electro-rheological fluid means is inoperative, and vice versa.

14. The apparatus of claim 9, including means for sensing the rotational position of each butterfly valve, to provide an indication of the amount of airflow permitted by each valve through said valve's respective outlet duct portion.

15. The apparatus of claim 10, including means for sensing the rotational position of each butterfly valve, to provide an indication of the amount of airflow permitted by each valve through said valve's respective outlet duct portion.

* * * * *

UNITED STATES PATENT AND TRADEMARK OFFICE
CERTIFICATE OF CORRECTION

PATENT NO. : 4,749,004
DATED : June 7, 1988
INVENTOR(S) : Douglas E. Peash

It is certified that error appears in the above-identified patent and that said Letters Patent are hereby corrected as shown below:

Claim 10, column 6, line 60, "air" should be -- pair --.

Claim 12, column 7, line 14, "driven" should be -- drive --.

Signed and Sealed this

Thirty-first Day of January, 1989

Attest:

DONALD J. QUIGG

*Attesting Officer*   *Commissioner of Patents and Trademarks*